(12) United States Patent
Mun

(10) Patent No.: US 12,359,786 B2
(45) Date of Patent: *Jul. 15, 2025

(54) LAMP FOR VEHICLE AND VEHICLE INCLUDING THE SAME

(71) Applicant: HYUNDAI MOBIS CO., LTD., Seoul (KR)

(72) Inventor: Sun Kwon Mun, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,823

(22) Filed: Apr. 18, 2024

(65) Prior Publication Data

US 2024/0263755 A1 Aug. 8, 2024

Related U.S. Application Data

(63) Continuation of application No. 17/875,564, filed on Jul. 28, 2022, now Pat. No. 11,988,349.

(30) Foreign Application Priority Data

Aug. 11, 2021 (KR) .......................... 10-2021-0106301

(51) Int. Cl.
*F21S 41/24* (2018.01)
*F21S 41/143* (2018.01)
*F21S 41/265* (2018.01)

(52) U.S. Cl.
CPC ............. *F21S 41/24* (2018.01); *F21S 41/143* (2018.01); *F21S 41/265* (2018.01)

(58) Field of Classification Search
CPC ...... F21S 41/143; F21S 41/153; F21S 41/265; F21S 41/27; F21S 41/25; F21S 41/24;
(Continued)

(56) References Cited

U.S. PATENT DOCUMENTS 9,222,637 B2 12/2015 Potter
2003/0214815 A1 11/2003 Ishida et al.
(Continued)

FOREIGN PATENT DOCUMENTS

| CN | 109681843 A | * | 4/2019 | ............... B60Q 1/14 |
| CN | 20190080506 A | * | 4/2019 | |
| KR | 20190080506 A | | 7/2019 | |

OTHER PUBLICATIONS

Search English translation of CN-109681843-A (Year: 2019).*
Search English translation of KR-20190080506-A.*

*Primary Examiner* — Omar Rojas Cadima
(74) *Attorney, Agent, or Firm* — NovoTechIP International PLLC

(57) ABSTRACT

Disclosed is a lamp for a vehicle including a light source that outputs light, a light guide provided on a front side of the light source, and an inner lens provided on a front side of the light guide, the light guide includes an input area, into which the light is input from the light source, a reflection area connected to the input area, extending in one direction, and that totally reflects the light input from the input area, and an output area formed in an opposite direction to the input area with respect to the reflection area, connected to the reflection area, and in which the light reflected by the reflection area travels in a direction that faces the inner lens.

18 Claims, 8 Drawing Sheets

(58) Field of Classification Search
CPC ........ F21S 41/322; F21S 41/285; G02B 3/08; G02B 6/0001; G02B 19/0028; G02B 3/04; F21W 2102/13
See application file for complete search history.

(56) References Cited

U.S. PATENT DOCUMENTS

| | | |
|---|---|---|
| 2017/0038023 A1 | 2/2017 | Gromfeld |
| 2017/0089541 A1* | 3/2017 | Nakajima ................ B60Q 1/22 |
| 2017/0343718 A1 | 11/2017 | Lin et al. |

* cited by examiner

LAMP FOR VEHICLE AND VEHICLE INCLUDING THE SAME

CROSS-REFERENCE TO RELATED APPLICATIONS

This application is a continuation application from U.S. patent application Ser. No. 17/875,564 filed on Jul. 28, 2022 and titled "LAMP FOR VEHICLE AND VEHICLE INCLUDING THE SAME," which claims priority to and benefit of Korean Patent Application No. 10-2021-0106301, filed in the Korean Intellectual Property Office on Aug. 11, 2021, the entire contents of which are incorporated herein by reference.

BACKGROUND

1. Technical Field

The present disclosure relates to a lamp for a vehicle and a vehicle including the same, and more particularly, relates to a lamp for a vehicle that may have a slim structure and enhance an optical efficiency as well, and a vehicle including the same.

2. Discussion of Related Art

As the importance of aesthetic aspects required by vehicles has increased, requirements for aesthetic aspects of lamps mounted on the vehicles also have increased. In particular, when the lamp for a vehicle is a headlamp mounted on a front side of the vehicle, it is required for the lamp to have a slim structure having a small vertical size to increase an aesthetic aspect.

However, generally, when the structure of the lamp becomes slimmer, an optical efficiency of the lamp rapidly decreases, and thus a performance of the lamp is degraded. Conventionally, power consumptions of a lamp have been increased to solve the problems, but it has been recently consistently required to decrease power consumptions due to environmental regulations, for example, on discharge of carbon, and thus an optical efficiency of the lamp cannot be enhanced by increasing the power consumptions further.

In addition, there is a difficulty in having to develop conflicting technologies capable of having to prevent an increase in the power consumptions of the lamp by preventing degradation of the optical efficiency while implementing a slim structure of the lamp.

SUMMARY

The present disclosure has been made to solve the above-mentioned problems occurring in the prior art while advantages achieved by the prior art are maintained intact.

An aspect of the present disclosure provides a lamp for a vehicle that may prevent degradation of a performance of the lamp while having a slim lens.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source that outputs light, a light guide provided on a front side of the light source, and an inner lens provided on a front side of the light guide, the light guide includes an input area, into which the light is input from the light source, a reflection area connected to the input area, extending in one direction, and that totally reflects the light input from the input area, and an output area formed in an opposite direction to the input area with respect to the reflection area, connected to the reflection area, and in which the light reflected by the reflection area travels in a direction that faces the inner lens, the output area is located on an upper side of the input area, and the reflection area is formed to be inclined upwards from the input area toward the output area.

The reflection area may include a first reflection surface located on a front side of the input area, and that primarily reflects the light input from the input area, and a second reflection surface located on an upper side of the first reflection surface, and that secondarily reflects the light reflected by the first reflection surface.

The second reflection surface may be formed to be curved according to curvatures having a first focus (F1) and a second surface (F2).

The first focus (F1) may be formed in the output area.

The second focus (F2) may be formed on a lower side of the first reflection surface, and may be formed within a forward/rearward widthwise direction of the first reflection surface.

The first reflection surface may be formed to be inclined such that a path of the light reflected from an arbitrary point of the first reflection surface to the second reflection surface coincides with a line that connects the second focus (F2) and the second reflection surface.

The inner lens may be an aspheric lens.

The inner lens may be a multi-facet lens (MFL).

A focus of the inner lens may be formed at a location corresponding to the first focus (F1).

A focus of the inner lens in a vertical direction ("V") and a focus of the inner lens in a horizontal direction ("H") may be formed at the same location.

A focus of the inner lens in a vertical direction ("V") and a focus of the inner lens in a horizontal direction ("H") may be formed at different locations.

A plurality of focuses of the inner lens may be formed in the horizontal direction ("H").

The light guide and the inner lens may be integrally formed.

The output area may be formed such that one surface of the output area located in an opposite direction to the reflection area is concave toward the reflection area.

The output area may be formed such that one surface of the output area located in an opposite direction to the reflection area is convex toward the opposite direction to the reflection area.

The output area may be formed such that one surface of the output area located in an opposite direction to the reflection area is flat.

A plurality of light sources may be provided.

The light source may include a light emitting diode (LED) light source.

According to an aspect of the present disclosure, a vehicle includes a plurality of lamps for the vehicle, wherein the plurality of lamps form beam patterns, respectively, the plurality of beam patterns overlap each other to form a low beam pattern, each of the lamps includes a light source that outputs light, a light guide provided on a front side of the light source, and an inner lens provided on a front side of the light guide, the light guide includes an input area, into which the light is input from the light source, a reflection area connected to the input area, extending in one direction, and that totally reflects the light input from the input area, and an output area formed in an opposite direction to the input area with respect to the reflection area, connected to the reflection area, and in which the light reflected by the reflection area travels in a direction that faces the inner lens, the output area is located on an upper side of the input area, and the reflection area is formed to be inclined upwards from the input area toward the output area.

An interval between focuses of the inner lens of some of the plurality of lamps in a horizontal direction ("H") may be different from an interval between focuses of the inner lens of others of the plurality of lamps in the horizontal direction ("H").

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, a lamp for a vehicle and a vehicle according to the present disclosure will be described with reference to the drawings.

Lamp for Vehicle

Figure 1:
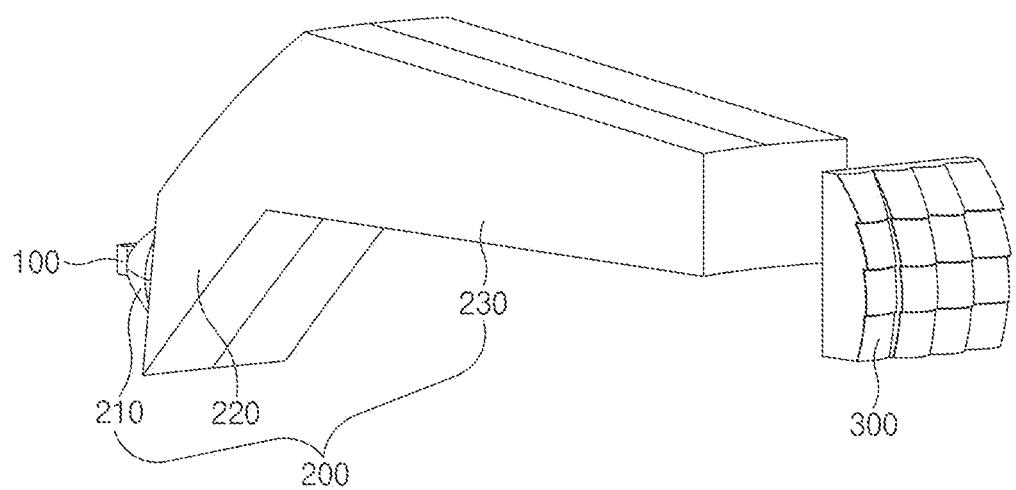
FIG. 1 is a perspective view illustrating a structure of a lamp for a vehicle according to an embodiment of the present disclosure.
Figure 2A:
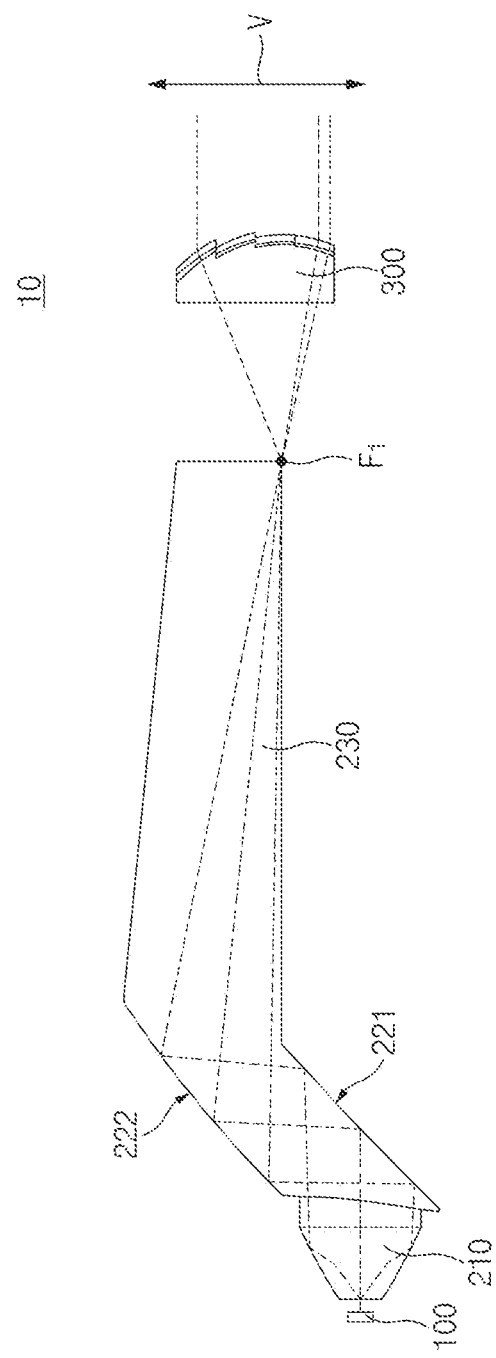
FIG. 2A is a longitudinal sectional view illustrating a travel path of light output from a light source in the lamp for a vehicle of FIG. 1.
Figure 2B:
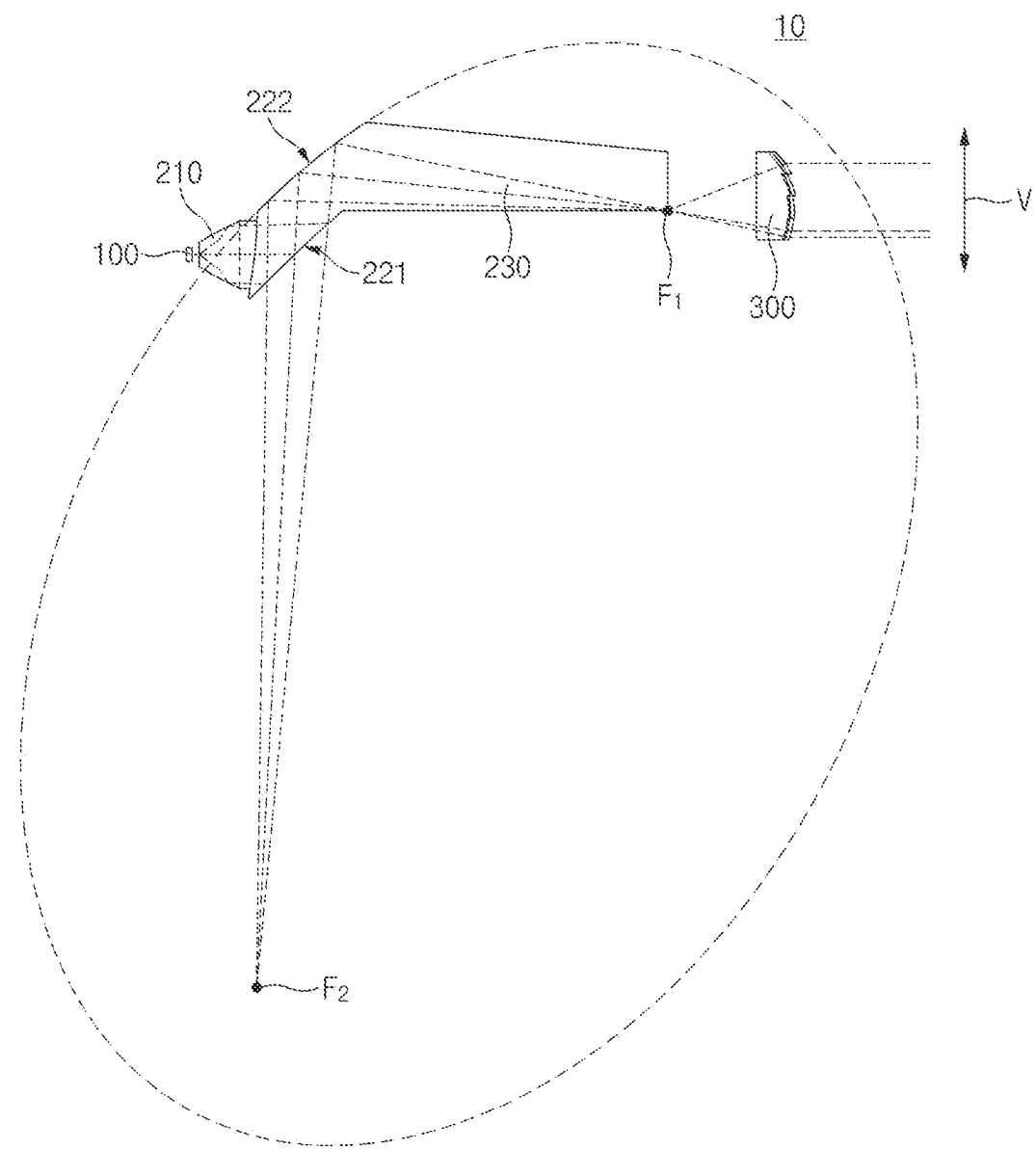
FIG. 2B is a longitudinal sectional view illustrating a travel path of light according to a focus of a second reflection surface in the lamp for a vehicle of FIG. 1 in more detail.
Figure 3A:
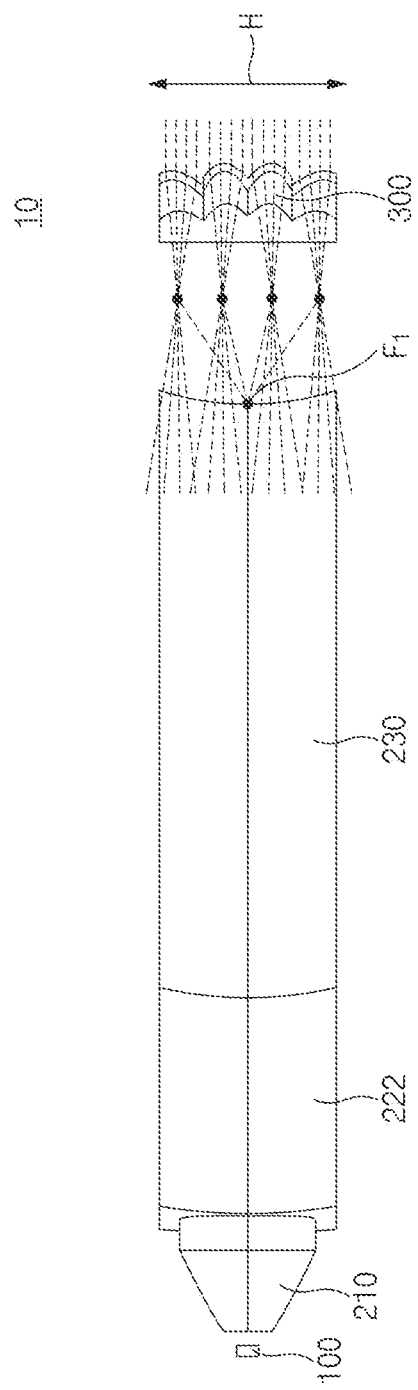
FIG. 3A is a plan view illustrating an appearance of a lamp for a vehicle according to an embodiment of the present disclosure, when viewed from a top.
Figure 3B:
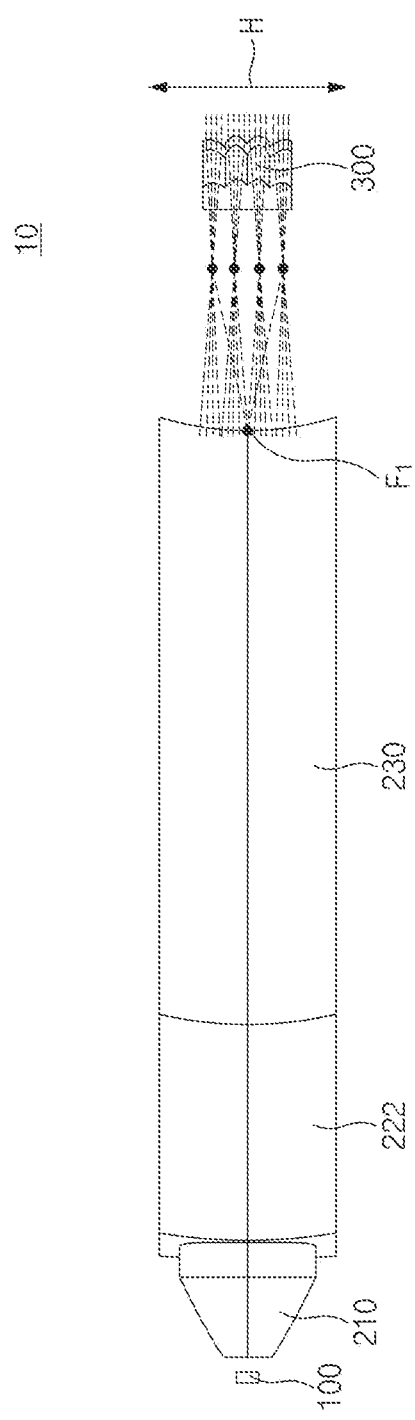
FIG. 3B is a plan view illustrating an appearance of a lamp for a vehicle according to another embodiment of the present disclosure, when viewed from a top.
Figure 4:
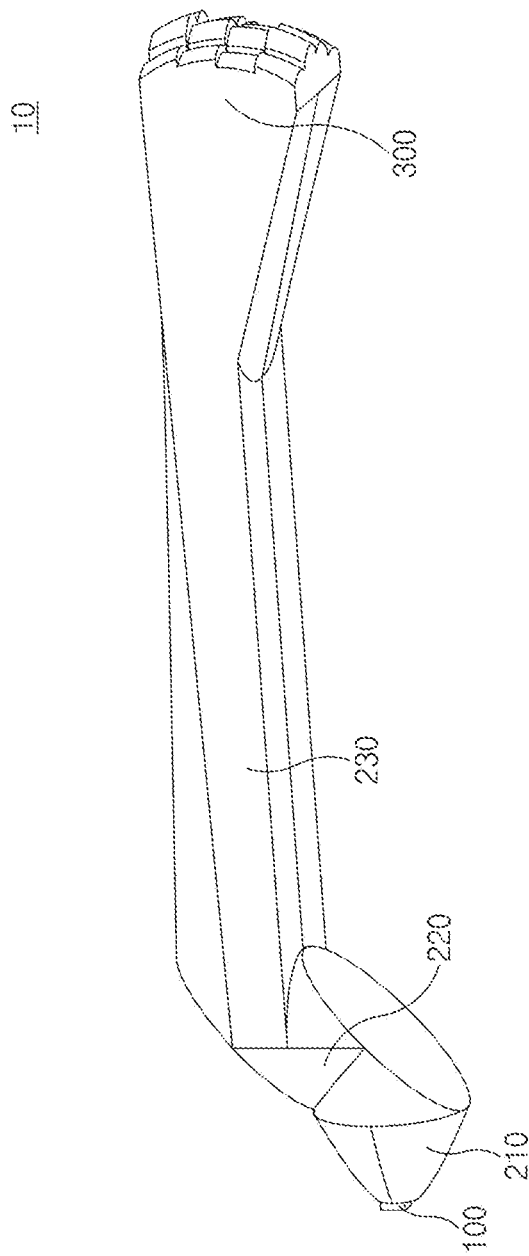
FIG. 4 is a perspective view illustrating a structure of a lamp for a vehicle according to another embodiment of the present disclosure.
Figure 5:
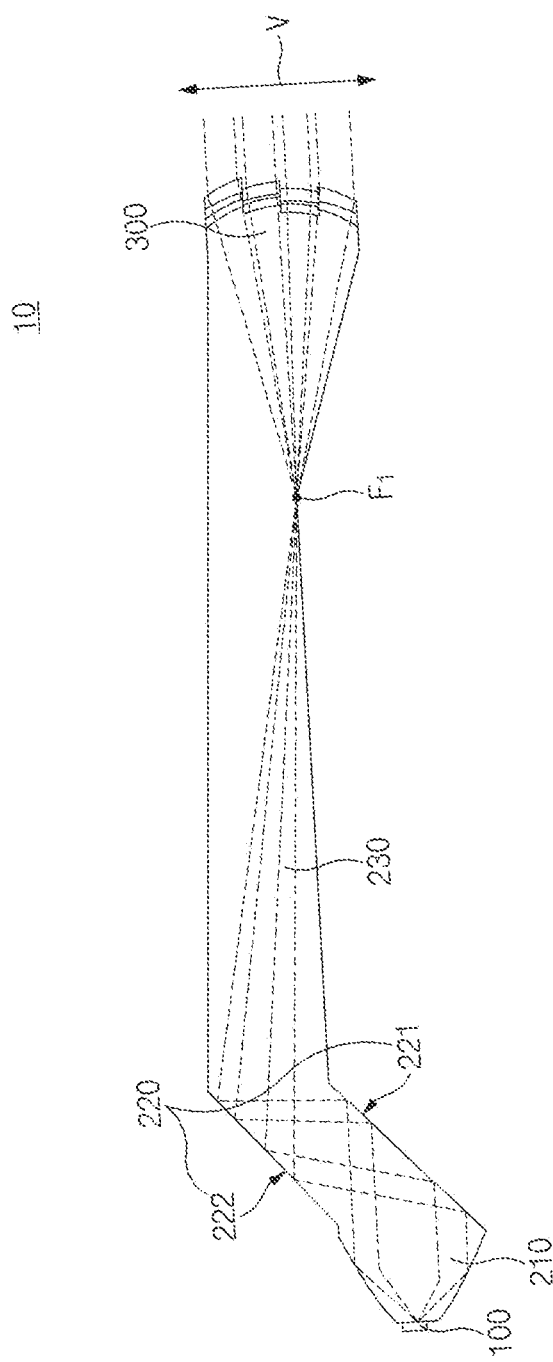
FIG. 5 is a longitudinal sectional view illustrating a travel path of light output from a light source in the lamp for a vehicle of FIG. 4.
Figure 6:
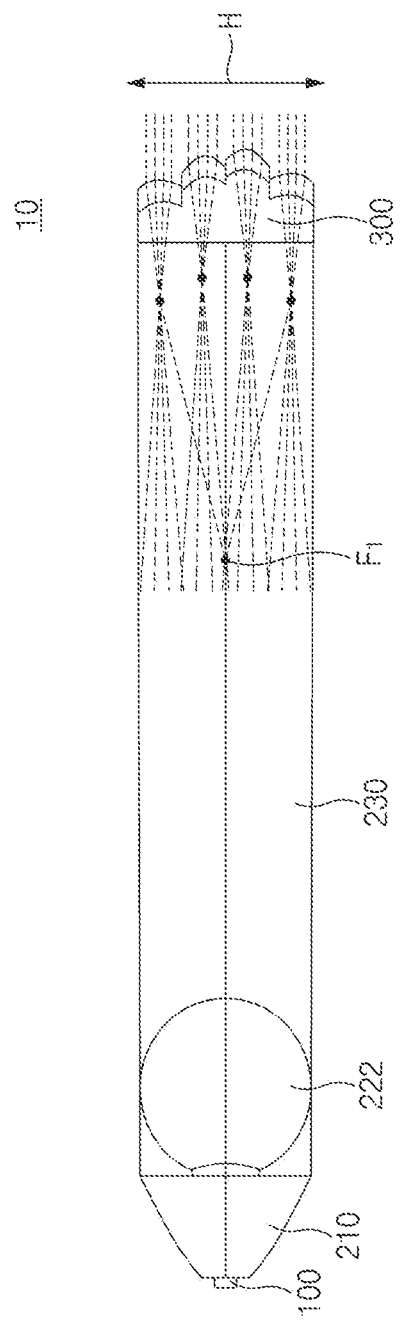
FIG. 6 is a plan view illustrating an appearance of the lamp for a vehicle of FIG. 4, when viewed from a top.

FIG. 1 is a perspective view illustrating a structure of a lamp for a vehicle according to an embodiment of the present disclosure. FIG. 2A is a longitudinal sectional view illustrating a travel path of light output from a light source in the lamp for a vehicle of FIG. 1. FIG. 2B is a longitudinal sectional view illustrating a travel path of light according to a focus of a second reflection surface in the lamp for a vehicle of FIG. 1 in more detail. FIG. 3A is a plan view illustrating an appearance of a lamp for a vehicle according to an embodiment of the present disclosure, when viewed from a top. FIG. 3B is a plan view illustrating an appearance of a lamp for a vehicle according to another embodiment of the present disclosure, when viewed from a top. Furthermore, FIG. 4 is a perspective view illustrating a structure of a lamp for a vehicle according to another embodiment of the present disclosure. FIG. 5 is a longitudinal sectional view illustrating a travel path of light output from a light source in the lamp for a vehicle of FIG. 4. FIG. 6 is a plan view illustrating an appearance of the lamp for a vehicle of FIG. 4, when viewed from a top.

Referring to FIGS. 1 to 6, a lamp 10 for a vehicle according to the present disclosure may include a light source 100 that outputs light, a light guide 200 provided on a front side of the light source 100, and an inner lens 300 provided on a front side of the light guide 200.

The light source 100 is a configuration for irradiating light, and various configurations are possible. For example, one or a plurality of light sources 100 may be provided in each lamp 10 for a vehicle, and the light sources 100 may be light emitting diodes (LEDs), micro-LEDs, and the like, but are not limited thereto.

The light guide 200 is a configuration that is provided on a front side of the light source 100 and a rear side of the inner lens 300, and various configurations are possible for the light guide 200. In detail, the light guide 200 may include an input area 210, a reflection area 220, and an output area 230. That is, the light output from the light source sequentially passes through the input area 210, the reflection area 220, and the output area 230 of the light guide 200, and may reach the inner lens 300. Furthermore, the light guide 200 may have a form of a waveguide that extends along a travel direction of the light to enhance a uniformity of a light distribution pattern formed by the lamp 10 for a vehicle.

The inner lens 300 is a configuration provided on a front side of the light guide 200, and may have various configurations. For example, the inner lens 300 may be an aspheric lens or a multi-facet lens (MFL). In detail, the inner lens 300 may employ a single-focus aspheric lens having one curved surface to make the lamp for a vehicle light, and may employ a multi-facet lens (MFL) having a plurality of facets to design the lamp for a vehicle more slimly.

In more detail, when the inner lens 300 is a multifocal lens, a focus of the inner lens 300 in a vertical direction "V" and a focus of the inner lens 300 in a horizontal direction "H" may be variously formed according to required functions and performances of the lamp 10 for a vehicle. As an example, the focus of the inner lens 300 in the vertical direction "V" and the focus of the inner lens 300 in the horizontal direction "H" may be formed at the same location. As an example, the focus of the inner lens 300 in the vertical direction "V" and the focus of the inner lens 300 in the horizontal direction "H" may be formed at different locations. Then, it is apparent that a plurality of focuses of the inner lens 300 may be formed in the horizontal direction "H". Furthermore, as illustrated in FIGS. 3A and 3B, a leftward/rightward width (the vertical direction with reference to the drawings) of the inner lens 300 may be adjusted such that the plurality of focuses in the horizontal direction "H" have various intervals. Contents on the focuses of the inner lens 300 will be described below in more detail.

Meanwhile, in the lamp 10 for a vehicle according to the present disclosure, because the input area 210, the reflection area 220, and the output area 230 of the light guide 200 are sequentially formed with respect to the travel path of the light to miniaturize the lamp 10 for a vehicle and enhance optical efficiency, and the input area 210, the reflection area 220, and the output area 230 of the light guide 200 will be described below in more detail.

First, the input area is an area, into which the light is input from the light source 100, and may be located between the light source 100 and the reflection area 220. In detail, the input area 210 is a collimator that generates parallel light, and may convert the light output from the light source 100 to the parallel light and allow the parallel light to reach the reflection area 220 as a horizontal light source. Then, the input area 210 may increase a light input efficiency as a total internal reflection (TIR) lens is applied.

The reflection area 220 is an area that has a rear portion connected to the input area 210, extends in one direction, and in which the light input from the input area 210 is totally reflected, and may be located between the input area 210 and the output area 230.

Then, the reflection area 220, as illustrated in FIG. 1, may be formed to be inclined upwards from the input area 210 toward the output area 230, which will be described below. Accordingly, light paths of all the light that travels horizontally from the input area 210, as illustrated in FIG. 2A, may be changed by the reflection area 220.

In detail, the reflection area 220 may include a first reflection surface 221 and a second reflection surface 222 that changes the light paths by using the total reflection.

Here, the first reflection surface 221, as illustrated in FIG. 2A, may be located on a front side of the input area 210, and may primarily reflect the light input from the input area 210 to the second reflection surface 222. Then, the first reflection surface 221 may be formed to be inclined upwards to the front side to reflect the light to the second reflection surface 222.

For example, when the second reflection surface 222, which will be described below, has curved surfaces of ellipses having a first focus F1 and a second focus F2, the first reflection surface 221, as illustrated in FIG. 2B, may be formed to be inclined such that a path of the light reflected from an arbitrary point of the first reflection surface 221 to the second reflection surface 222 coincides with a line that connects the second focus F2 and the second reflection surface 222. This is for a purpose of forming a light path, in which the light that passed through the first reflection surface 221 and the second reflection surface 222 converges to the first focus F1 according to a property of the ellipses.

Furthermore, the first reflection surface 221 may have various shapes, and for example, may have a shape such as a circular shape or a rectangular shape. Furthermore, as illustrated in FIG. 2A, a front end of the first reflection surface 221 may be located on a rear side of a front end of the second reflection surface 222.

The second reflection surface 222, as illustrated in FIG. 2A, may be located on an upper side of the first reflection surface 221, and may secondarily reflect the light reflected from the first reflection surface 221 to the output area 230. Then, the second reflection surface 222 may be formed to be inclined to reflect the light to the output area 230. For example, the second reflection surface 222, as illustrated in FIG. 2B, may be formed to be curved according to the curvatures of the ellipse having the first focus F1 and the second focus F2. That is, the second reflection surface 222 may have a partial shape of the ellipse having the first focus F1 and the second focus F2.

Here, the first focus F1 is a light focus, to which the light reflected from the second reflection surface 222 is condensed, and as illustrated in FIG. 2B, may be formed in the output area 230. Furthermore, the first focus F1 may be formed at various locations of the output area 230 according to the function and the performance of the lamp 10 for a vehicle. For example, when the lamp 10 for a vehicle is implemented by a low beam lamp, the first focus F1, as illustrated in FIGS. 2A and 2B, may be formed on a lower side of the output area 230.

The second focus F2 is not a focus, to which the light is condensed, and is a reference point that is a reference for setting a light path such that the light reflected from the first reflection surface 221 and the second reflection surface 222 is condensed to the first focus F1. Accordingly, the second focus F2, as illustrated in FIG. 2B, may be formed on a lower side of the first reflection surface 221 such that the first focus F1 is formed in the output area 230, and may be formed within a forward/rearward widthwise direction of the first reflection surface 221.

Meanwhile, the output area 230 is an area that is formed in an opposite direction to the input area 210 with reference to the reflection area 220 and is connected to a front portion of the reflection area 220, and in which the light reflected from the reflection area 220 travels in a direction that faces the inner lens 300, and may be located between the reflection area 220 and the inner lens 300.

Then, the output area 230, as illustrated in FIG. 2A, may be located on an upper side of the input area 210. In more detail, a lower end of the output area 230 may be located higher than an upper end of the input area 210 such that the light input from the light source 100 reaches the output area 230 via the reflection area 220 while not traveling directly to the output area 230.

Furthermore, the output area 230 may have various shapes. For example, the output area 230 may extend long to a location of the first focus F1, to which the light is condensed along a light travel direction. Then, referring to FIG. 2A, a lower surface of the output area 230 may be formed horizontally in a forward/rearward direction in consideration of a travel direction of the light, and an upper surface of the output area 230 may be formed to be inclined downwards while having a specific inclination toward the inner lens 300. However, the shape of the output area 230 is not limited thereto.

Meanwhile, a portion of the light reflected from the second reflection surface 222 may not be condensed to the first focus F1 due to spreading of the light, an assembly error during the manufacturing process of the lamp 10, and the like. Accordingly, in consideration of the required functions and performances of the lamp 10 for a vehicle, one surface of the output area 230 located in an opposite direction to the reflection area of the output area 230 may have various shapes. As an example, one surface of the output area 230, as illustrated in FIGS. 3A and 3B, may be formed to be concave toward the reflection area 220 such that the light output from the output area 230 is spread out. As another example, one surface of the output area 230 may be formed to be convex toward an opposite direction to the reflection area 220 such that the light output from the output area 230 gathers. As another example, it is apparent that one surface of the output area 230 may be formed to be flat.

Meanwhile, the first focus F1 of the light guide 200, the focus of the inner lens 300 in the vertical direction "V", and the focus of the inner lens 300 in the horizontal direction "H" will be described below in more detail.

The first focus F1 of the second reflection surface 222, and the focuses of the inner lens 300 in the vertical direction "V" and the horizontal direction "H" may be formed at various locations according to the required functions and performances of the lamp 10 for a vehicle.

As an example, when strong light is required, for example, in a hot zone of the low beam light distribution pattern, the focuses of the inner lens 300 in the vertical direction "V" and the horizontal direction "H" may be formed at the locations corresponding to the first focus F1. Then, the case, in which the focuses of the inner lens 300 in the vertical direction "V" and the horizontal direction "H" are located to correspond to the first focus F1, may be construed to include a case, in which the focuses of the inner lens in the vertical direction "V" and the horizontal direction "H", and the first focus F1 are considerably close to each other such that there is no substantially difference in aspects of functions and effects as compared with a case, in which the focuses of the inner lens 300 in the vertical direction "V" and the horizontal direction "H", and the first focus F1 overlap each other, which may be devised by an ordinary person in the art.

As another example, when an intensity of light is relatively low and a spreading angle of light is necessary as compared with the hot zone, for example, in a spread zone of the low beam light distribution pattern, as illustrated in FIGS. 3A and 3B, a plurality of focuses of the inner lens 300 may be formed in the horizontal direction "H" while deviating the locations corresponding to the first focus F1. Here, the spreading angle of the light may be adjusted by adjusting an interval of the focuses of the inner lens 300 in the horizontal direction "H". Furthermore, the focuses of the inner lens 300 in the vertical direction "V" may be formed at various locations. However, it is preferable that the focuses of the inner lens 300 in the vertical direction are still formed at locations corresponding to the first focus F1 as described above to satisfy an intensity of light of a specific reference.

Meanwhile, a plurality of focuses of the inner lens 300 may be formed in the horizontal direction "H" even when the lamp 10 for a vehicle according to the present disclosure is used to form a hot zone of a low beam light distribution pattern. However, as compared with the case, in which the spread zone is to be formed, the intervals of the focuses in the horizontal direction "H" may be relatively small. This is for the purpose of satisfying a high intensity of light, which is required by the hot zone.

Meanwhile, in the lamp 10 for a vehicle according to another embodiment of the present disclosure, as illustrated in FIGS. 4 to 6, the light guide 200 and the inner lens 300 may be integrally formed. In detail, the output area 230 of the light guide 200 and one surface of the inner lens 300, which faces the light guide 200, may be connected to each other to constitute one integral lens. That is, because the light guide 200 and the inner lens 300 are integrally formed, an assembly tolerance when the lamp 10 for a vehicle is manufactured may be reduced.

In more detail, the inner lens 300 integrally formed with the light guide 200 may extend toward the light guide 200 to be connected to the output area 230 of the light guide 200. The, the inner lens 300 may have various shapes.

In detail, the lower surface and the upper surface of the inner lens 300 extending toward the light guide 200 may be formed to be inclined upwards or downwards toward an opposite direction to the light guide 200. Furthermore, the lower surface and the upper surface of the inner lens 300 may be formed to be inclined at the same inclination as those of the lower surface and the upper surface of the output area 230 of the light guide 200, or may be formed to be inclined while forming specific angles with the lower surface and the upper surface of the output area 230 of the light guide 200 with different inclinations.

For example, in the lamp 10 for a vehicle that forms the low beam pattern, the lower surface of the inner lens 300 extending toward the light guide 200 may be formed to be inclined downwards toward an opposite direction to the light guide 200, and as illustrated in FIGS. 4 and 5, may form a specific angle with the lower surface of the output area 230 such that a shield may be formed to have a lens shape while a separate shield structure is not applied. Furthermore, the upper surface of the inner lens 300 extending toward the light guide 200 may be formed to be inclined downwards toward an opposite direction to the light guide 200 while having the same inclination as that the upper surface of the output area 230.

Vehicle

A vehicle according to the present disclosure may include the lamp 10 for a vehicle. Then, the lamp 10 may be various lamps including low beam lamps, high beam lamps, daytime running lamps (DRLs), and position lamps.

For example, the lamp 10 for a vehicle applied to the vehicle according to the present disclosure may be a configuration for forming a low beam pattern of the vehicle.

In more detail, the vehicle according to the present disclosure may include a plurality of lamps 10 for a vehicle, beam patterns are formed in each of the plurality of lamps 10 for a vehicle and the plurality of beam patterns overlap each other to form a low beam pattern, and each of the lamps 10 for a vehicle may include the light source 100 that outputs light, the light guide 200 provided on a front side of the light source, and the inner lens 300 provided on the front side of the light guide.

As described above, here, the light guide 200 may include the input area 210, into which the light is input from the light source 100, the reflection area 220 that is connected to the input area 210 and extends in one direction, and in which the light input from the input area 210 is totally reflected, and the output area 230 that is formed in the opposite direction to the input area 210 with respect to the reflection area 220 and is connected to the reflection area 220, and in which the light reflected from the reflection area 220 travels in a direction that faces the inner lens 300, the output area 230 may be located on an upper side of the input area 210, and the reflection area 220 may be formed to be inclined upwards toward the output area 230 from the input area 210.

Furthermore, it is apparent that the contents described above on the light source 100, the light guide 200, and the inner lens 300 may be applied to the vehicle according to the present disclosure in the same way.

Meanwhile, as described above, when the lamp 10 for a vehicle has a configuration of forming a low beam pattern, a central area of the beam pattern needs to have a high intensity of light, and a peripheral area of the beam pattern needs to cover a wide range in the horizontal direction instead of having a low intensity of light.

To achieve this, the intervals of the focuses, in the horizontal direction "H", of the inner lenses 300 of some of the plurality of lamps 10 for a vehicle provided in the vehicle according to the present disclosure may be different from the intervals of the focuses, in the horizontal direction "H", of the inner lenses 300 of others of the plurality of lamps 10.

In more detail, referring to FIGS. 3A and 3B, the inner lens 300, in which the intervals of the focuses in the horizontal direction are relatively small as illustrated in FIG. 3B, is used in the central area (that is, the hot zone) of the beam pattern that requires a high intensity of light, and the inner lens 300, in which the intervals of the focuses in the horizontal direction are relatively large as illustrated in FIG. 3A, is used in the peripheral area (that is, the spread zone) that requires a relatively low intensity of light and needs to cover a wide range in the horizontal direction.

Meanwhile, the contents described above on the lamp 10 for a vehicle according to the present disclosure may be applied to the contents on the lamp 10 for a vehicle, which is mounted on the vehicle according to the present disclosure, in the same way. Accordingly, a detailed description of the lamp 10 for a vehicle, which is mounted on the vehicle according to the present disclosure, will be replaced by the contents described above on the lamp 10 for a vehicle according to the present disclosure.

The lamp for a vehicle according to the embodiment of the present disclosure may increase a uniformity of a light distribution pattern of the lamp for a vehicle by constituting the light guide in a waveguide form that extends along a travel direction of light.

Furthermore, the lamp for a vehicle according to the embodiment of the present disclosure may prevent degradation of a performance of the lamp for a vehicle by sequentially constituting the input area, the reflection area, and the output area in the light guide of the waveguide form and thus enhancing the optical efficiency while having a slim structure.

In addition, the lamp for a vehicle according to another embodiment of the present disclosure may implement the lamps of various functions, such as a low beam lamp, a high beam lamp, a daytime running light (DRL) lamp, and a position lamp by using a multi-facet lens (MFL) as the inner lens with a similar design.

Furthermore, according to another embodiment of the present disclosure, an assembly tolerance when the lamp for a vehicle is manufactured may be reduced by integrally forming the light guide and the inner lens, and the number of components may be reduced by forming the shield with a lens shape while a separate shield structure is not applied when the low beam is implemented.

Although it is apparent that the present disclosure has been described with reference to the limited embodiments and the drawings, the present disclosure is not limited thereto, and the present disclosure may be variously carried out by an ordinary person in the art within the technical spirit of the present disclosure and the equivalent ranges of the claims.

What is claimed is:

1. A lamp for a vehicle, comprising:
   a light source configured to output light;
   a light guide positioned in front of the light source; and
   an inner lens positioned in front of the light guide,
   wherein the light guide includes:
     an input area configured to receive the light output from the light source;
     a reflection area having a rear portion connected to the input area and configured to reflect the light received by the input area; and
     an output area connected to a front portion of the reflection area, wherein the light reflected by the reflection area travels toward the inner lens through the output area,
   wherein the output area is positioned higher than the input area,
   wherein the reflection area is inclined upwardly from the rear portion toward the front portion and includes a first reflection surface and a second curved reflection surface that changes light paths of the light received by the input area into a total reflection of the light received by the input area to a focal point in the output area,
   wherein the first reflection surface is facing and inclined with respect to the input area, and configured to reflect the light received by the input area and formed to be inclined upwards to the front portion of the reflection area to reflect the light received from the input area to the second reflection surface,
   wherein the second curved reflection surface is positioned above the first reflection surface and configured to reflect the light reflected by the first reflection surface, and
   wherein the second curved reflection surface has a curvature having a first focus and a second focus different than the first focus.

2. The lamp of claim 1, wherein the first focus of the second curved reflection surface is positioned at the output area of the light guide.

3. The lamp of claim 1, wherein the second focus of the second curved reflection surface is positioned below the first reflection surface and vertically overlapped by the first reflection surface.

4. The lamp of claim 3, wherein the first reflection surface is inclined such that a path of the light reflected from an arbitrary point of the first reflection surface to the second curved reflection surface coincides with a line that connects the second focus and the second reflection surface.

5. The lamp of claim 1, wherein the inner lens comprises an aspheric lens.

6. The lamp of claim 1, wherein the inner lens comprises a multi-facet lens (MFL).

7. The lamp of claim 1, wherein a focus of the inner lens is positioned at a location corresponding to that of the first focus.

8. The lamp of claim 7, wherein a first focus of the inner lens in a vertical direction and a second focus of the inner lens in a horizontal direction are commonly located.

9. The lamp of claim 7, wherein a first focus of the inner lens in a vertical direction and a second focus of the inner lens in a horizontal direction are positioned at different locations.

10. The lamp of claim 9, wherein the inner lens has a plurality of foci arranged in the horizontal direction.

11. The lamp of claim 1, wherein the light guide and the inner lens are integrally formed.

12. The lamp of claim 1, wherein the light source comprises a plurality of light sources.

13. The lamp of claim 1, wherein the light source includes a light emitting diode (LED).

14. A vehicle comprising a plurality of lamps respectively outputting a plurality of beam patterns overlapping each other to form a low beam pattern, wherein each lamp includes the lamp of claim 1, wherein a horizontal interval between focuses of the inner lens of some of the lamps is different from that between foci of the inner lens of other lamps.

15. A lamp for a vehicle, comprising:
   a light source configured to output light;
   a light guide positioned in front of the light source; and
   an inner lens positioned in front of the light guide,
   wherein the light guide includes:
     an input area configured to receive the light output from the light source;
     a reflection area having a rear portion connected to the input area and configured to reflect the light received by the input area; and
     an output area connected to a front portion of the reflection area, wherein the light reflected by the reflection area travels toward the inner lens through the output area,
   wherein the output area is positioned higher than the input area,
   wherein the reflection area is inclined upwardly from the rear portion toward the front portion and includes a first reflection surface and a second curved reflection surface that changes light paths of the light received by the input area into a total reflection of the light received by the input area to a focal point in the output area, wherein the first reflection surface is facing and inclined with respect to the input area, and configured to reflect the light received by the input area and formed to be inclined upwards to the front portion of the reflection area to reflect the light received from the input area to the second reflection surface, wherein a surface of the output area facing the inner lens is either concave or convex.

16. The lamp of claim 15, wherein a surface of the output area facing the inner lens is convex.

17. The lamp of claim 15, wherein a surface of the output area facing the inner lens is concave.

18. A vehicle comprising a plurality of lamps respectively outputting a plurality of beam patterns overlapping each other to form a low beam pattern, wherein each lamp among the plurality of lamps includes a lamp comprised of:
  a light source configured to output light;
  a light guide positioned in front of the light source; and
  an inner lens positioned in front of the light guide,
  wherein the light guide includes:
    an input area configured to receive the light output from the light source;
    a reflection area having a rear portion connected to the input area and configured to reflect the light received by the input area; and
    an output area connected to a front portion of the reflection area, wherein the light reflected by the reflection area travels toward the inner lens through the output area, wherein the output area is positioned higher than the input area, wherein the reflection area is inclined upwardly from the rear portion toward the front portion and includes a first reflection surface and a second reflection surface that changes light paths of the light received by the input area into a total reflection of the light received by the input area into the output area, wherein the first reflection surface is facing and inclined with respect to the input area, and configured to reflect the light received by the input area and formed to be inclined upwards to the front portion of the reflection area to reflect the light received from the input area to the second reflection surface, and wherein a horizontal interval between focuses of the inner lens of some of the lamps is different from that between foci of the inner lens of other lamps.

* * * * *